US010670727B2

(12) United States Patent
Revol et al.

(10) Patent No.: US 10,670,727 B2
(45) Date of Patent: Jun. 2, 2020

(54) METHOD AND SYSTEM TO VALIDATE GEOPOSITIONING BY SATELLITE

(71) Applicant: THALES, Courbevoie (FR)

(72) Inventors: Marc Revol, Valence (FR); Philippe Laviron, Valence (FR)

(73) Assignee: THALES, Courbevoie (FR)

( * ) Notice: Subject to any disclaimer, the term of this patent is extended or adjusted under 35 U.S.C. 154(b) by 126 days.

(21) Appl. No.: 15/534,634

(22) PCT Filed: Dec. 9, 2015

(86) PCT No.: PCT/EP2015/079114
§ 371 (c)(1),
(2) Date: Jun. 9, 2017

(87) PCT Pub. No.: WO2016/091949
PCT Pub. Date: Jun. 16, 2016

(65) Prior Publication Data
US 2017/0322313 A1    Nov. 9, 2017

(30) Foreign Application Priority Data

Dec. 12, 2014   (FR) ..................................... 14 02840

(51) Int. Cl.
*G01S 19/08*  (2010.01)
*G01S 19/21*  (2010.01)
(Continued)

(52) U.S. Cl.
CPC .............. *G01S 19/08* (2013.01); *G01S 19/15* (2013.01); *G01S 19/215* (2013.01); *G01S 19/49* (2013.01);
(Continued)

(58) Field of Classification Search
CPC ........ G01S 19/08; G01S 19/15; G01S 19/215; G01S 19/49; G01S 19/47; G01C 21/165
(Continued)

(56) References Cited

U.S. PATENT DOCUMENTS

| 5,225,842 A | * | 7/1993 | Brown | .................... | G01S 19/51 |
| | | | | | 342/357.46 |
| 6,181,274 B1 | * | 1/2001 | Pratt | ....................... | G01S 19/44 |
| | | | | | 342/357.27 |

(Continued)

FOREIGN PATENT DOCUMENTS

| EP | 2674779 A1 | 12/2013 |
| WO | 2016091949 | 6/2016 |

OTHER PUBLICATIONS

O'Hanlon et al., "Real-Time GPS Spoofing Detection via Correlation of Encrypted Signals, Navigation", 2013, pp. 267-278, vol. 60, No. 4.
(Continued)

*Primary Examiner* — Chuong P Nguyen
(74) *Attorney, Agent, or Firm* — Thompson Coburn LLP; Steven M. Ritchey; Bradley H. Thomas (57) ABSTRACT

The invention relates to a method and system for the validation of satellite-based positioning. The system comprises a radio navigation device (10) installed on board a mobile carrier (2), including a satellite geo-positioning device (12) able to receive a composite radio signal including a plurality of radio navigation signals each transmitted by a transmitting satellite and including time-synchronization and position-reference information, the radio navigation
(Continued)

device being able to carry out processing of the received radio navigation signals to calculate first navigation information including information on the geographical position, speed and time of the carrier.

The radio navigation device (10) is capable of transmitting baseband digitized signals ($IF_1, \ldots, IF_N$) from radio navigation signals received at the reference processing station (16), the reference processing station (16) is capable of carrying out processing (29) similar to the processing (20), carried out by said radio navigation device (10), of the digitized signals ($IF_1, \ldots, IF_N$) in order to calculate second navigation information, and the system comprises means (22, 42) for validating the first navigation information in accordance with the second navigation information calculated by the reference processing station (16).

17 Claims, 2 Drawing Sheets

(51) Int. Cl.
*G01S 19/49* (2010.01)
*G01S 19/15* (2010.01)
*G01S 19/39* (2010.01)
*G01S 19/42* (2010.01)
*G01S 19/47* (2010.01)
*G01C 21/16* (2006.01)

(52) U.S. Cl.
CPC ............ *G01C 21/165* (2013.01); *G01S 19/39* (2013.01); *G01S 19/421* (2013.01); *G01S 19/47* (2013.01)

(58) Field of Classification Search
USPC ............... 342/357.45, 357.53, 357.3, 357.32
See application file for complete search history.

(56) References Cited

U.S. PATENT DOCUMENTS

| | | | | |
|---|---|---|---|---|
| 6,340,947 B1* | 1/2002 | Chang | .................... | G01S 5/0054 |
| | | | | 342/357.43 |
| 6,785,553 B2* | 8/2004 | Chang | ...................... | G01S 5/14 |
| | | | | 342/357.48 |
| 6,944,534 B2* | 9/2005 | Trautenberg | ............ | G01S 19/08 |
| | | | | 340/995.12 |
| 7,570,204 B1* | 8/2009 | McGraw | .................. | G01S 19/32 |
| | | | | 342/357.27 |
| 7,904,243 B2* | 3/2011 | Cohen | ..................... | G01S 19/06 |
| | | | | 342/350 |
| 8,159,393 B2* | 4/2012 | Xie | ......................... | G01S 19/42 |
| | | | | 342/357.78 |
| 8,378,887 B2* | 2/2013 | Xie | ......................... | G01S 19/42 |
| | | | | 342/357.3 |
| 8,665,156 B2* | 3/2014 | Ische | ..................... | G01S 5/0009 |
| | | | | 342/357.28 |
| 8,878,722 B2* | 11/2014 | Revol | ....................... | G01P 1/16 |
| | | | | 342/357.35 |
| 8,930,706 B2* | 1/2015 | Pujante Cuadrupani | .................... | |
| | | | | G01S 19/33 |
| | | | | 713/176 |
| 9,423,501 B2* | 8/2016 | Revol | ..................... | G01S 19/09 |
| 9,606,238 B2* | 3/2017 | Carter | .................... | G01S 19/05 |
| 9,658,341 B2* | 5/2017 | Mathews | ................ | G01S 11/10 |
| 10,101,458 B2* | 10/2018 | Carter | .................... | G01S 19/05 |
| 2004/0160365 A1* | 8/2004 | Riley | .................... | G01S 5/0221 |
| | | | | 342/451 |
| 2010/0161179 A1* | 6/2010 | McClure | ................. | B63B 27/02 |
| | | | | 701/41 |
| 2013/0106655 A1 | 5/2013 | Cuadrupani | | |
| 2016/0033649 A1* | 2/2016 | Mathews | ................ | G01S 5/021 |
| | | | | 342/357.48 |

OTHER PUBLICATIONS

International Search Report of International Application No. PCT/EP2015/079114 dated Feb. 3, 2016, 3 pages.

\* cited by examiner

METHOD AND SYSTEM TO VALIDATE GEOPOSITIONING BY SATELLITE

CROSS-REFERENCE TO RELATED APPLICATIONS

This application is a U.S. National Phase application of PCT/EP2015/079114, filed on Dec. 9, 2015, claiming the benefit of FR Application No. 14 02840, filed Dec. 12, 2014, both of which are incorporated herein by reference in their entireties.

FIELD OF THE INVENTION

The present invention relates to a validation method and system of a radio navigation device installed on board a mobile carrier, including a satellite geo-positioning device able to receive a composite radio signal including a plurality of radio navigation signals each transmitted by a transmitting satellite and including time-synchronization and position-reference information, and carrying out processing of the received radio navigation signals to calculate first navigation information.

BACKGROUND OF THE INVENTION

The field of the invention relates to securing, strengthening and enhancing geo-positioning by satellite, in particular in the context of the use of geo-positioning equipment for the navigation of moving carriers.

It is applicable in many fields, for example aeronautics, maritime transport, road guidance, vehicle and robot guidance.

One favored field of application is that of the precision approach in aeronautics, based on the use of GNSS (Global Navigation Satellite System) navigation systems. For example, the American GPS (Global Positioning System) and the European GALILEO system are known.

A GNSS receiver is a device able to receive radio signals emitted by a plurality of satellites and to provide, after calculation, time-synchronization and position-reference information of the carrier in a geographical reference.

Each GNSS receiver extracts received time and carrier phase information sent in radio signals transmitted by various satellites, and calculates, for each satellite in view and from that received information, a positioning measurement, which is an estimate of the distance between the geo-positioning device itself and the satellite in view, which is also called pseudo-range. The pseudo-range is different from the actual distance between the satellite in question and the geolocation device due to errors in estimating the propagation delay, for example due to atmospheric conditions in the troposphere, in the ionosphere, and the synchronization error in the internal clock geo-positioning receiver. It is, however, possible to eliminate common errors (including the time bias of the receiver) by using the information sent by a plurality of separate satellites.

In many navigation applications, the precision, availability and integrity of the calculation of the position and the time bias are particularly important for the safety of the carrier.

There are several causes that may affect the integrity of the calculated geo-positioning position, for example any breakdowns or malfunctions of the satellites, the receiving chain of the geo-positioning device, various disruptions and interferences and/or deliberate and ill-intentioned jamming.

Known methods to increase geo-positioning make it possible to improve precision and provide solutions with greater integrity and robustness, for example the RAIM (receiver autonomous integrity monitoring), SBAS (satellite-based augmentation system), GBAS (ground-based augmentation system) systems.

However, these methods have limitations.

For an onboard system, improving the processing precision and robustness may involve high algorithmic complexity and require substantial processing resources.

Furthermore, the design of certified onboard systems is constrained by the regulations in force associated with the standardized processing architectures.

There is thus a need to validate and improve the geo-positioning precision provided by onboard radio navigation devices, while respecting the aforementioned constraints.

SUMMARY OF THE INVENTION

To that end, the validation method of a radio navigation device installed on board a mobile carrier, includes a satellite geo-positioning device able to receive a composite radio signal including a plurality of radio navigation signals each transmitted by a transmitting satellite and including time-synchronization and position-reference information, the radio navigation device being able to carry out processing of the received radio navigation signals to calculate first navigation information including information on the geographical position, speed and time of the carrier.

The method includes the following steps:
  transmitting, by said radio navigation device, baseband digitized signals from the received radio navigation signals to a reference processing station,
  implementing, by said reference processing station, processing similar to the processing done by said radio navigation device of the baseband digitized signals to calculate second navigation information,
  validating the first navigation information based on the second navigation information calculated by the reference processing station.

Advantageously, the invention makes it possible to duplicate and augment the processing operations done on board a reference processing station, for example situated on the ground, and therefore to eliminate the constraints imposed on the onboard equipment.

In particular, one of the purposes of the invention is to allow the detection of hardware failures of the onboard radio navigation device, the processing done by the reference processing station being done redundantly and in a segregated manner, completely independently of the processing done on board.

The method according to the invention may also have one or more of the features below:
  the calculation of the first navigation information further uses inertial positioning information provided by an inertial positioning module associated with the radio navigation device, and the transmission step further includes a transmission of said inertial positioning information associated with the radio navigation device to the reference processing station;
  a step, carried out by said reference processing station, consisting of performing at least one complementary processing operation of the received baseband digitized signals, not done by the radio navigation device, so as to obtain second navigation information with augmented precision;

the reference processing station is able to calculate second navigation information from a radio navigation signal transmitted by a plurality of satellite constellations, each satellite constellation transmitting according to a given geo-positioning system;

a complementary processing operation consists of implementing a spatial precision augmenting step, carrying out the processing of local differential correction information received from a ground reference station;

at least one complementary processing operation consists of carrying out a step for calculating the geographical position implementing frequencies of the carriers of the received baseband digitized signals;

at least one complementary processing operation consists of carrying out a step for monitoring the integrity of the received baseband digitized signals;

at least one complementary processing operation consists of carrying out a step for monitoring jamming and decoys of the received baseband digitized signals.

According to a second aspect, the invention relates to a system to validate geo-positioning by satellite, comprising a radio navigation device installed on board a mobile carrier, includes a satellite geo-positioning device able to receive a composite radio signal including a plurality of radio navigation signals each transmitted by a transmitting satellite and including time-synchronization and position-reference information, the radio navigation device being able to carry out processing of the received radio navigation signals to calculate first navigation information including information on the geographical position, speed and time of the carrier, and a reference processing station.

The system to validate geo-positioning by satellite according to the invention is such that:

the radio navigation device is able to transmit baseband digitized signals from the received radio navigation signals to the reference processing station, the reference processing station is able to perform processing similar to the processing done by said radio navigation device of the digitized signals to calculate second navigation information, the system includes means for validating first navigation information based on the second navigation information calculated by the reference processing station.

The system according to the invention may also have one or more of the features below:

the reference processing station includes at least one module capable of performing at least one complementary processing operation of the received baseband digitized signals, not done by the radio navigation device, so as to obtain second navigation information with augmented precision;

the reference processing station includes a computing module able to calculate second navigation information from a radio navigation signal transmitted by a plurality of satellite constellations, each satellite constellation transmitting according to a given geo-positioning system;

the reference processing station includes a module for augmenting spatial precision augmenting step, carrying out the processing of local differential correction information received from a ground reference station;

the reference processing station includes a module for calculating the geographical position implementing frequencies of the carriers of the received baseband digitized signals;

the reference processing station includes a module for monitoring the integrity of the received baseband digitized signals;

the reference processing station includes a module for monitoring jamming and decoys of the baseband digitized signals;

the reference processing station includes a validation module, able to validate compliance with local safety regulations and provide monitoring of reception quality at the onboard radio navigation device, comprising detecting sources of interference, jamming and decoys, as well as augmented precision information;

the means for validating first navigation information based on second navigation information calculated by the reference processing station are implemented by a validation module of the radio navigation device, capable of receiving, from the validation module of the reference processing station, aside from the second navigation information, control information developed by the reference processing station, comprising said augmented precision information and said information relative to the reception quality.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF THE INVENTION

Figure 1:
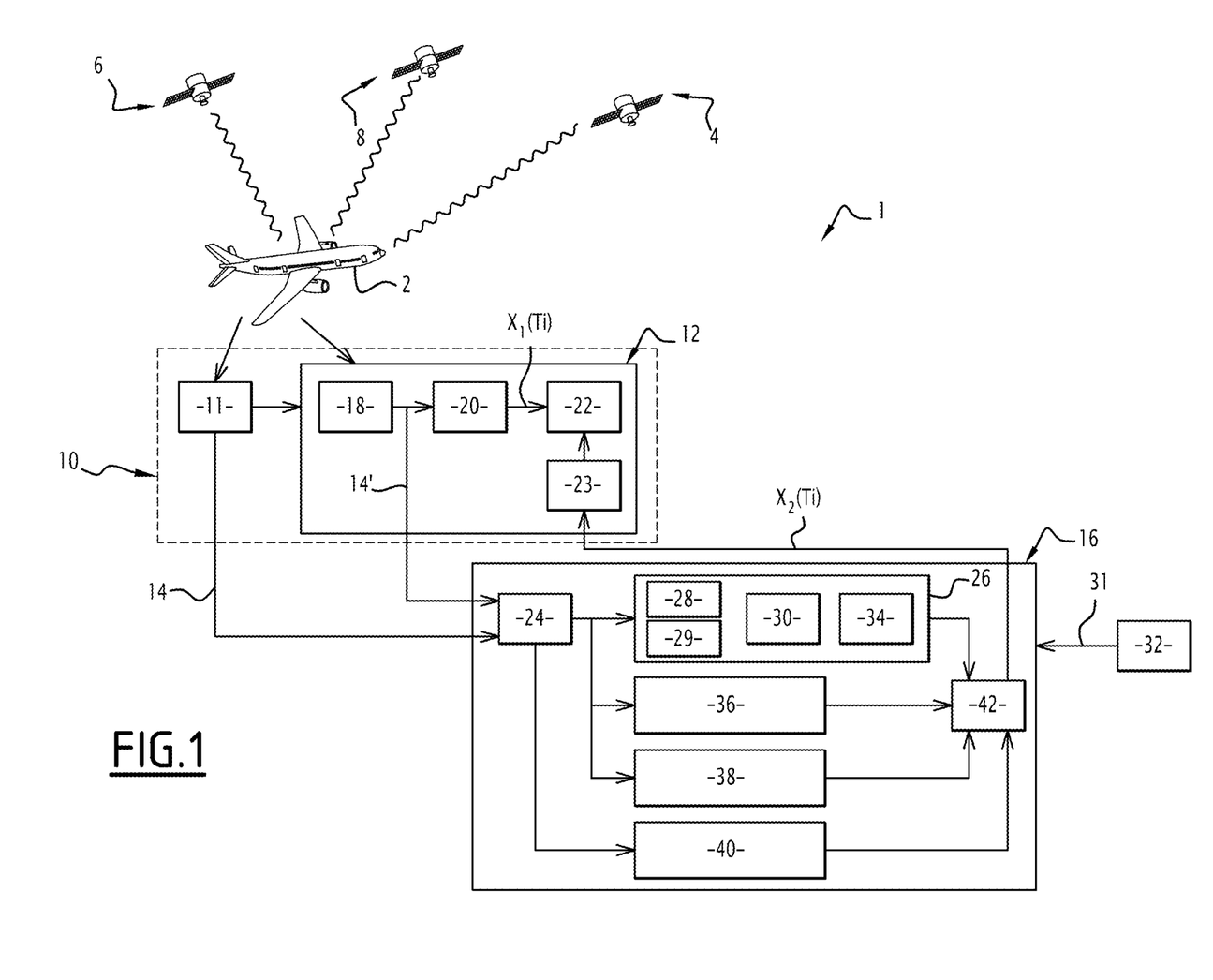
FIG. 1 is a diagrammatic illustration of a geolocation system implementing the invention.

FIG. 1 illustrates a geolocation system 1 suitable for carrying out the invention, in the context of assisting in the navigation of a mobile carrier 2, which is an aircraft in the example of FIG. 1.

As previously mentioned, the invention is not limited to this embodiment, and more generally applies to the geolocation of any mobile carrier.

The mobile carrier 2 includes receivers (not shown) able to receive radio signals in several predefined frequency bands, containing time-synchronization and position-reference information for several constellations of geolocation satellites, for example a first constellation 4 of satellites of the GPS system and a second constellation 6 of satellites of another system, for example Galileo.

In general, the mobile carrier 2 is able to receive radio signals coming from one or several GNSS geolocation systems, which are capable of transmitting in predefined frequency bands.

Furthermore, the mobile carrier 2 is able to receive correction and integrity data for a constellation 8 of geostationary satellites, depending on the type of satellite-based augmentation system (SBAS), which are also transmitted in these radio signals transmitted on the same predefined frequency bands.

In a known manner, the SBAS system uses geostationary satellites that make it possible to augment one or several constellations of GNSS satellites, such as the GPS system, capable of sending the geo-location receivers correction messages comprising correction information for positioning measurements and integrity relative to each of the satellites.

The SBAS system accounts for errors from separate sources: ionospheric error, satellite clock corrections, system bias corrections. It includes orbit corrections for GNSS satellites, and specific corrections for signals transmitted by the satellites (group delay, lever arm, etc.). The SBAS system also provides integrity information, for example to calculate protection radii associated with the calculated positions, designed to quantify the confidence associated with the sent correction information.

Technical standard RTCA DO-229D "Minimum Operational Performance Standards for Global Positioning System/Wide Area Augmentation System Airborne Equipment" defines the SBAS spatial augmentation system relative to the GPS system.

The present invention pertains to the improvement of the safety of navigation information, provided by the onboard geolocation equipment, through an off board reference processing chain on the ground, making it possible to continuously ensure a secure and augmented position calculation, off board within this infrastructure.

The present invention is in particular dedicated to the on board improvement of safety (and not only security) of high-integrity navigation applications (called "Safety of Life"), and pertains to the global improvement service for navigational safety, made possible through the principle of off board navigation calculation.

The mobile carrier 2 comprises a radio navigation device 10, comprising an inertial positioning module 11 and a geolocation device 12, which jointly provide first navigation information of the mobile carrier 2, comprising geolocation information and information relative to its trajectory, used to assist with navigation by a pilot, as well as automatic navigation by instrumentation.

The set of onboard equipment is called "airplane system".

The inertial positioning module 11 is a known navigation instrument, capable of estimating the acceleration and orientation of the mobile carrier 2, and deducing its attitude, speed and position therefrom.

The inertial positioning module 11 provides inertial position information 14, used for navigation and also transmitted, by wireless communication means (not shown), to a reference processing station 16, located on the ground, also called "ground system", which will be described in more detail later.

These wireless communication means are for example a radio or GSM transceiver.

Thus, the first navigation information includes position, time and speed information (PTS data), and optionally, attitude information for the carrier.

In one embodiment, the speed and attitude information of the carrier are provided by the inertial positioning module 11.

In one alternative embodiment, the speed and attitude information of the carrier are calculated by combining inertial positioning information and geolocation position.

The geolocation device 12, on board the mobile carrier 2, includes a RF chain 18 for receiving and digitizing received radio signals, an onboard processing module 20 (also called COM) and a module 22 for validating navigation information (PTS).

The RF chain 18 for receiving and digitizing signals in space (SIS) makes it possible to receive radio signals transmitted in GNSS frequency bands (for example frequency bands L1, L2 and L5 in the case of GPS).

In general, the RF chain 18 is able to receive signals $RF_1, \ldots, RF_N$ in N frequency bands, filter them, frequency transpose them and digitize them to obtain signals $IF_1, \ldots, IF_N$ on a same intermediate frequency, called baseband digitized signals.

Thus, at the output of the RF chain 18, the intermediate frequency signals $IF_1, \ldots, IF_N$ are transmitted on the one hand to the fixed reference processing station 16, and on the other hand to the onboard processing module 20 to apply digital processing.

The onboard processing module 20 is capable of processing the signals received from the constellation of satellites for which it is certified, for example the GPS and SBAS signals in one embodiment, to calculate, in real time, the position of this moving carrier 2 at each moment in time.

The radio navigation device 10 thus transmits the digitized signals $IF_1, \ldots, IF_N$ to the reference processing station 16, including both the time-synchronization and position-reference information transmitted by the constellations of satellites 4, 6 and the correction and integrity data transmitted by the constellation 8 of geostationary satellites.

The digitized signals $IF_1, \ldots, IF_N$ are transmitted continuously or in pulses 14', by a radiofrequency communication module (not shown) with sufficient bandwidth, to a receiving module of the reference processing station 16.

Thus, advantageously, the reference processing station 16 receives the same digitized digital data as the onboard processing module 20.

The onboard processing module 20 includes hardware and software elements able to calculate its geolocation position, according to the three spatial positioning components x, y and z in an ECEF frame of reference, as well as a time component connecting the GPS system time and the local time of the geolocation device.

Furthermore, the onboard processing module 20 is able to use the received SBAS signals, and calculate an integrity radius associated with the position calculation done.

The onboard processing module 20 in particular includes a programmable device able to perform calculations, in particular comprising one or several processors, and one or several storage memories.

The processing module 20 makes it possible to obtain, as output, at each considered moment in time Ti, a position vector P(Ti) representative of the geolocation position of the mobile carrier, its speed and the local time (PTS data), the moments in time being given in a universal time reference and an associated integrity radius, grouped together in the first navigation information $X_1(Ti)$.

Alternatively, the PTS data is obtained by hybrid calculation using the position vectors P(Ti) and the orientation, speed and position/attitude data provided by the inertial positioning module 11.

This first navigation information $X_1(Ti)$ is transmitted to a validation module 22, able to use second navigation information $X_2(Ti)$ or validation information coming from the fixed reference processing unit 16 to validate the precision of the onboard radio navigation device, and, if applicable, to carry out a corrective action such as raising an alarm if the first navigation information calculated on board is not considered to be valid.

The validation module 22 is implemented in a programmable device able to perform calculations, in particular comprising one or several processors, and one or several storage memories.

The reference processing station 16 comprises a radiofrequency receiving module 24, or receiver, capable of receiving the information 14, 14', and distributing it toward modules of the reference processing station 16.

In particular, the digitized signals $IF_1, \ldots, IF_N$ are transmitted to a GNSS processing module 26.

The GNSS processing module 26 comprises first fixed processing modules (MON) 28, 29, capable of implementing at least processing similar to that of the onboard processing module (COM) 20, to calculate navigation information of the carrier, by using hardware and software elements belonging to the reference processing station 16, which are completely independent of the onboard hardware and software elements.

The fixed processing module 28 is able to perform geographical position calculations of the mobile carrier 2 similar to those done by the on board processing module 20, by using the signals $IF_1, \ldots, IF_N$ containing time-synchronizations and position-reference information of the satellites, as well as correction and integrity data.

Advantageously, the fixed processing module 28 thus makes it possible to functionally duplicate the processing operations done on board the mobile carrier 2, in a segregated manner, and consequently in particular to validate the proper operation of the hardware and software elements of the on board processing module 20.

In case of nominal operation of the on board equipment, the processing module 28 provides second navigation information practically identical to the first navigation information calculated on board, to within any instrumental noise.

The processing module 28 duplicates the processing of the received radio navigation signals done on board by the on board processing module 20, which is limited, for complexity and cost reasons, to the exploitation of radio navigation signals of a single constellation of satellites, which is the GPS constellation.

The multi-constellation processing module 29 is able to use the radio navigation signals received from several constellations of satellites. Thus, the multi-constellation processing module 29 is able to calculate, in parallel with the processing module 28, second navigation information with improved precision. This multi-constellation processing module 29 monitors the GPS navigation and implements the use of regional constellations that may be imposed by national mandates.

Thus, in one embodiment, the fixed processing module 28 is capable of exploiting the GPS radio navigation signals and SBAS correction messages, similarly to the processing done on board by the on board processing module 20. The multi-constellation processing module 29 exploits radio navigation signals transmitted by other constellations of satellites, for example GALILEO and/or GLONASS.

The processing modules 28 and 29 perform multi-constellation associated position, speed and time (PTS) calculations, based on shared input signals $IF_1, \ldots, IF_N$. The time dating is done in a universal time reference, for example UTC, and the position is calculated in a shared geodesic reference (WGS84).

Thus, the first navigation information calculated by the reference processing station 16 is strengthened.

In the illustrated embodiment, the GNSS processing module 26 also comprises a spatial precision augmenting module 30 able, locally, to receive differential correction information 31 from a ground reference station 32. Thus, a position correction calculation is done by the spatial precision augmenting module 30, based on the known position of the ground reference station 32 and in a controlled radiofrequency environment.

The GNSS processing module 26 also comprises a calculating module 34, able to perform additional calculations making it possible to obtain better geographical positioning precision.

Preferably, the processing module 34 applies RTK (real-time kinematics) processing, using the carrier phases of the signals $IF_1, \ldots, IF_N$, which makes it possible to achieve a centimetric positioning performance for the calculated position vector P'(Ti).

Additionally, the reference processing station 16 comprises a module for monitoring the quality of the signals 36.

This module for monitoring the quality of the signals 36 uses signals received by the ground reference stations 32. It also uses the signals $IF_1, \ldots, IF_N$ to perform known processing operations to monitor integrity, for example spectral analysis, correlation form analysis, or other known error detection techniques associated with multiple paths.

Advantageously, the reference processing station 16 has powerful processing resources allowing more expansive monitoring of the disruption domains, such as the number of correlation points describing the correlation function of the signal or the spectral domain and the coverage resolution by the spectral analysis means, implemented by one or several spectral analysis calculation modules.

Additionally and optionally, the reference processing station 16 comprises a module for monitoring jamming and decoys 38 that uses algorithms for verifying the received signals making it possible to detect any inconsistencies and raise alerts in case of detection.

The joint observation of the measurements done on the different constellations and the different navigation services received in the same frequency band constitutes a first level of analysis. A second level consists of comparing the navigation information delivered simultaneously from open signals and protected signals (P(Y) GPS or PRS Galileo), when the reference processing station is authorized to process the protected signals. A third level consists of estimating the consistency of the code phase and carrier measurements, over all of the received signals.

Furthermore, the reference processing station 16 comprises a module for calculating the composite geo-positioning 40 using the information 14 provided by the inertial positioning module 11.

This composite geo-positioning module 40 implements hybridization processing between the received GNSS signals $IF_1, \ldots, IF_N$ and the inertial increment information 14 to calculate, with better precision, the position and speed of the mobile carrier at each considered moment in time.

Similarly to the on board processing, the ground hybridization processing also makes it possible to control the integrity of the hybridization of the maximum separation type, using the hypothesis of a single satellite breakdown, but which may be extended to the case of multiple satellite breakdowns, due to the ground calculation resource reserve.

The outputs of the respective modules 26 (including the modules 28, 29, 30 and 34), 36, 38 and 40 are provided to a fixed validation module 42 of the reference processing station 16 that calculates second navigation information $X_2(Ti)$, comprising a set of corrected PTS information and associated protection radii.

This validation module 42, under the control of the local navigation authorities, allows the ground system to:
  verify that the security regulations requested by the local national authorities are correctly respected by the airplane system;
  provide monitoring of the quality of the reception environment, in particular the detection of interference, jamming or decoy sources, as well as estimating their impact on the navigation estimated on board;

strengthen the quality of the on board navigation through the consolidated estimates (multi-constellation, augmentation, assistance and RTK) obtained from augmented processing operations on the ground.

According to a first embodiment, this second navigation information $X_2(Ti)$ is transmitted to the on board validation module 22, which verifies the consistency between the positioning and speed information provided by the two processing channels.

The on board validation module 22 and the validation module associated with the processing done on the ground 23, installed on board, performs the cross-comparison of the positions and speeds, to command a corrective action, for example a cutoff of the transmission of navigation information to the rest of the navigation system, if a deviation is observed. The on board validation module 23 for validating information developed on the ground allows the airplane system under the control of the on board authority (the pilot) to account for and validate the information from the validation module 42 on the ground submitted to the local national authorities, before comparing the ground navigation information with the on board navigation information from the module 20.

The airplane systems receives, from the ground via the module 42, the following statuses:

Estimate on the ground of the on board navigation: second navigation information estimated by the processing module 28, which duplicates the processing operations done by the on board module 20, State of the interference, jamming and decoy environment, and impact on the on board navigation, Ground estimate of the augmented on board navigation:
  Estimate with the constellations mandated by the national authorities: second navigation information estimated by the multi-constellation processing module 29;
  Estimate with all local augmentation systems (GBAS, RTK, assisted-GNSS) implemented by the modules 30, 34;
  Estimate with all improved processing resources, in particular the module 40 (inertial hybridization, etc.).

According to this embodiment, the validation module 22 calculates the deviations between the first navigation information $X_1(Ti)$ and the second navigation information $X_2(Ti)$ with better precision calculated on the ground, and determines inconsistency alerts when the deviation exceeds a predetermined threshold.

According to a second embodiment, alerts are transmitted to the on board validation module 22, which takes corrective action on board the mobile carrier.

In this embodiment, the alerts raised by the on board validation module 22 may lead, depending on the local regulations in force:

either to abandoning the flight procedure in progress and switching to the complementary navigation means set out by the regulations, or to switching to the navigation estimates sent by the ground reference stations validated by the module 42.

Figure 2:
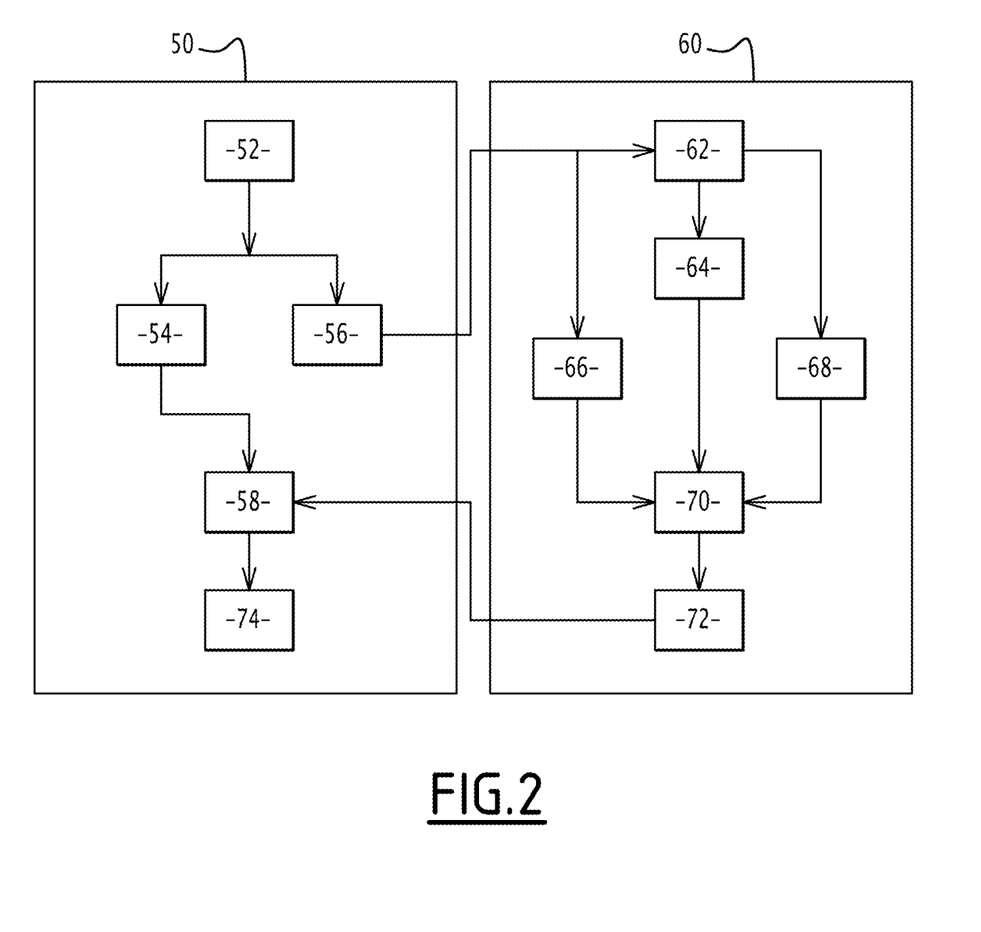
FIG. 2 is a summary of the main steps of a method to validate geo-positioning according to one embodiment of the invention.

FIG. 2 is a block diagram of the main steps of a method for validating a radio navigation device on board a mobile carrier according to one embodiment of the invention, steps 50 of which are carried out by a radio navigation device 10 on board a mobile carrier and steps 60 of which are carried out by a reference processing station 16.

The first step 52 is a step for receiving radio signals from satellites, filtering and digitization to obtain baseband signals $IF_1, \ldots, IF_N$. These signals contain radio navigation signals for constellations of satellites containing time-synchronizations and position-reference information of the satellites, as well as correction and integrity data.

The following steps 54 and 56 are carried out substantially in parallel.

During step 54, the radio navigation device 10 carries out a calculation making it possible to obtain first navigation information $X_1(Ti)$ of the carrier at given moments in time Ti.

Alternatively, the calculation in step 54 carries out a hybridization of the time-synchronization and position-reference information received from the radio navigation signals of the satellites and inertial or inertial increment time-synchronization and position-reference information, provided by the inertial positioning module 11.

The transmission step 56 implements the transmission of the time-synchronizations and position-reference information contained in the digitized signals $IF_1, \ldots, IF_N$ to the reference processing station 16.

Optionally, inertial or inertial increment positioning information provided by an on board inertial positioning module is also transmitted.

The reference processing station 16 implements a reception 62 of the digitized signals $IF_1, \ldots, IF_N$ and, if applicable, transmitted inertial positioning information.

Next, the reference processing station 16 implements a calculation 64, making it possible to calculate second navigation information $X_2(Ti)$. The algorithms implemented during this step 64 are similar to the algorithms implemented by the calculating step 54, for example PTS geolocation calculating algorithms according to the GPS/SBAS system.

If there is no hardware malfunction or calculation error of the on board hardware implemented in step 54, the second navigation information $X_2(Ti)$ calculated in step 64 is substantially identical, to within any instrumental noise, to the first navigation information $X_1(Ti)$ calculated in step 54 at the same moments in time.

A difference between the second navigation information $X_2(Ti)$ calculated in step 64 and the first navigation information $X_1(Ti)$ calculated in step 54 indicates a hardware malfunction at the geolocation device 12.

It should be noted that a hardware malfunction at the reference processing station 16 could also be considered. However, in the preferred embodiment of the invention, it is considered that the hardware of the reference processing station 16 is maintained so as to avoid hardware failures.

In order to improve the precision and integrity of the second navigation information $X_2(Ti)$, preferably, the reference processing station 16 further implements several complementary processing operations.

In the embodiment of FIG. 2, a first complementary processing operations 66 and second complementary processing operations 68 are carried out.

A first complementary processing operation 66 implements a calculation of second navigation information $X_2(Ti)$ of the multi-constellation type, exploiting the radio navigation signals received from several satellite constellations transmitting according to several GNSS systems. For example, GALILEO radio navigation signals are also exploited, jointly with the GPS radio navigation signals exploited during the calculating step 54. Thus, better integrity and availability is obtained for the calculation of the second navigation information $X_2(Ti)$.

The second complementary processing operations 68 are:
the calculation of the geographical position implementing frequencies of the carriers of the received baseband digitized signals, in RTK mode, providing a differential positioning with centimetric precision;
the augmented spatial precision augmenting step, carrying out the processing of local differential correction information received from a ground reference processing station;
carrying out monitoring of the integrity of the received baseband digitized signals;
carrying out monitoring of jamming and decoys of the received baseband digitized signals ($IF_1, \ldots, IF_N$);
hybridization processing between the received GNSS signals $IF_1, \ldots, IF_N$ and the inertial increment information to calculate, with better precision, the position and speed of the mobile carrier at each considered moment in time.

It is clear that the implementation of the invention is not limited to only these complementary processing operations, but applies with a larger number of complementary processing operations that may contribute additional precisions and consolidate the integrity and continuity of the positioning solution calculated by the reference processing station by implementing more sophisticated calculating algorithms or using enriched outside complementary information.

Advantageously, the reference processing station 16 has appropriate calculating means, for example a plurality of processors or computers, making it possible to perform a large volume of calculations in real time. Thus, the reference station implements all of the processing modules described above.

The various position calculations and integrity measurements are sent to an integration module 70, which calculates the more precise second navigation information $X_2(Ti)$ from the set of processing operations 64, 66, 68 carried out and associated protection radii.

This second navigation information $X_2(Ti)$ is transmitted to the geolocation device 12 during the transmission step 72.

The geolocation device 12 carries out a validation step 58, using a comparison of the first navigation information $X_1(Ti)$ and second navigation information $X_2(Ti)$.

The validation step 58 implements verification or cross-checking algorithms known in the aeronautics field as "Fail-Safe". A so-called fail-safe system means that the design of the system lessens the dangerousness of a failure, and therefore that it remains at least as safe as when it is working correctly.

In the event a difference between first and second navigation information at a given moment exceeds a predetermined threshold, an alarm is raised during a step 74.

Thus, the two calculation channels COM and MON develop the navigation information in parallel. The result of these calculations is compared by each of the channels. If a significant difference in the calculations is observed by one of the two channels, it activates a "switch out" switch that allows a physical interruption of the transmission of the calculated data to the user subassemblies, preventing the diffusion of unreported erroneous data toward the navigation airplane system.

Advantageously, the solution proposed by the invention implements dissimilar COM (on board command) and MON (ground monitoring) chains making it possible to ensure the independence of failures to prevent a single failure from causing an undetected failure and to improve the overall integrity of the navigation. To guarantee a high level of security, it is preferable for the MON_ and COM_modules to have different hardware (HW) and software (SW) architectures, so as to avoid the risk of undetected simultaneous joint failure by each of the two processing chains.

One main advantage of the proposed solution is the ability to perform such checks on the same signals as those which are used by the on board processing system, and not through off board observations that do not fully reflect the behavior of the signals received on board, and in particular that of local disruptions in the on board environment (multiple trips, interference, cycle skipping, etc.).

The invention claimed is:

1. A validation method of a radio navigation device installed on board a mobile carrier, including a satellite geo-positioning device able to receive a composite radio signal including a plurality of radio navigation signals each transmitted by a transmitting satellite and including time-synchronization and position-reference information, the radio navigation device being able to carry out processing of the received radio navigation signals to calculate first navigation information including information on the geographical position, speed and time of the carrier, the method comprising:
transmitting, by said radio navigation device, baseband digitized signals from the received radio navigation signals to a reference processing station;
implementing, by said reference processing station, processing to calculate second navigation information including information on the geographical position, speed and time of the carrier;
transmitting, by the reference processing station to the radio navigation device, the second navigation information; and
validating, by the radio navigation device, the first navigation information based on the second navigation information calculated by the reference processing station, comprising computing a difference between the first and second navigation information, comparing the difference to a predetermined threshold, and validating the first navigation information if the difference is below the predetermined threshold or raising an inconsistency alert if the difference is above the predetermined threshold.

2. The method according to claim 1, wherein the calculation of the first navigation information further uses inertial positioning information provided by an inertial positioning module associated with the radio navigation device, and wherein the step of transmitting, by said radio navigation device, further includes a transmission of said inertial positioning information associated with the radio navigation device to the reference processing station.

3. The method according to claim 1, further comprising a step, carried out by said reference processing station, consisting of performing at least one complementary processing operation of the received baseband digitized signals, not done by the radio navigation device, so as to obtain second navigation information with augmented precision.

4. The method according to claim 3, wherein the reference processing station is adapted to calculate second navigation information from a radio navigation signal transmitted by a plurality of satellite constellations, each satellite constellation transmitting according to a given geo-positioning system.

5. The method according to claim 3, wherein at least a complementary processing operation consists of implementing a spatial precision augmenting step, carrying out the processing of local differential correction information received from a ground reference station.

6. The method according to claim 3, wherein at least one complementary processing operation consists of carrying out a step for calculating the geographical position implementing frequencies of the carriers of the received baseband digitized signals.

7. The method according to claim 3, wherein at least one complementary processing operation consists of carrying out a step for monitoring the integrity of the received baseband digitized signals.

8. The method according to claim 3, wherein at least one complementary processing operation consists of carrying out a step for monitoring jamming and decoys of the received baseband digitized signals.

9. A system to validate geo-positioning by satellite, comprising a radio navigation device installed on board a mobile carrier, includes a satellite geo-positioning device able to receive a composite radio signal including a plurality of radio navigation signals each transmitted by a transmitting satellite and including time-synchronization and position-reference information, the radio navigation device being able to carry out processing of the received radio navigation signals to calculate first navigation information including information on the geographical position, speed and time of the carrier, and a reference processing station, wherein:
the radio navigation device is able to transmit baseband digitized signals from the received radio navigation signals to the reference processing station;
the reference processing station is adapted to (i) perform processing to calculate second navigation information including information on the geographical position, speed and time of the carrier, and (ii) transmit the second navigation information to the radio navigation device; and
the radio navigation device includes means for validating first navigation information based on the second navigation information calculated by the reference processing station, adapted to compute a difference between the first and second navigation information, to compare the difference to a predetermined threshold, and to validate the first navigation information if the difference is below the predetermined threshold or to raise an inconsistency alert if the difference is above the predetermined threshold.

10. The system according to claim 9, wherein the reference processing station comprises at least one module adapted to perform at least one complementary processing operation of the received baseband digitized signals, not done by the radio navigation device, so as to obtain second navigation information with augmented precision.

11. The system according to claim 10, wherein the reference processing station comprises a computing module adapted to calculate second navigation information from a radio navigation signal transmitted by a plurality of satellite constellations, each satellite constellation transmitting according to a given geo-positioning system.

12. The system according to claim 10, wherein the reference processing station comprises a module for augmenting spatial precision augmenting step, carrying out the processing of local differential correction information received from a ground reference station.

13. The system according to claim 10, wherein the reference processing station comprises a module for calculating the geographical position implementing frequencies of the carriers of the received baseband digitized signals.

14. The system according to claim 10, wherein the reference processing station comprises a module for monitoring the integrity of the received baseband digitized signals.

15. The system according to claim 10, wherein the reference processing station comprises a module for monitoring jamming and decoys of the baseband digitized signal.

16. The system according to claim 9, wherein the reference processing station comprises a fixed validation module, able to provide monitoring of reception quality at the onboard radio navigation device, comprising detecting sources of interference, jamming and decoys, and provide information relative to the reception quality, the fixed validation module being further able to compute augmented precision information.

17. The system according to claim 16, wherein the means for validating first navigation information based on second navigation information calculated by the reference processing station are implemented by an on-board validation module of the radio navigation device, the on-board validation module being adapted to receive, from the fixed validation module of the reference processing station, the second navigation information and control information computed by the reference processing station, the control information comprising said augmented precision information and said information relative to the reception quality.

* * * * *